United States Patent [19]

Ogawa et al.

[11] Patent Number: 5,032,428
[45] Date of Patent: Jul. 16, 1991

[54] METHOD FOR PRODUCING A MAGNETIC RECORDING MEDIUM

[75] Inventors: Hiroshi Ogawa; Shinji Saito; Hitoshi Noguchi, all of Kanagawa, Japan

[73] Assignee: Fuji Photo Film Co., Ltd., Kanagawa, Japan

[21] Appl. No.: 512,228

[22] Filed: Apr. 20, 1990

[30] Foreign Application Priority Data

Apr. 21, 1989 [JP] Japan ................................. 1-100268

[51] Int. Cl.$^5$ ............................................. H01F 10/02
[52] U.S. Cl. ..................................... 427/130; 427/131; 428/695; 428/900
[58] Field of Search ................ 427/130, 131; 428/695, 428/900

Primary Examiner—Bernard Pianalto
Attorney, Agent, or Firm—Sughrue, Mion, Zinn, Macpeak & Seas

[57] ABSTRACT

A method for producing a magnetic recording medium is disclosed, comprising coating on a nonmagnetic support a magnetic coating composition for forming a lower magnetic layer and a magnetic coating composition for forming an upper magnetic layer using a wet-on-wet coating method, thereby forming plural magnetic layers, followed by drying, and then conducting heat treatment thereof, wherein the magnetic coating composition for the upper magnetic layer contains ferromagnetic alloy particles are ferromagnetic particles and does not contain a lubricating agent which has polar groups and has a molecular weight of 3000 or less, the magnetic coating composition for the lower magnetic layer contains ferromagnetic iron oxide particles as ferromagnetic particles, a lubricating agent having polar groups and having a molecular weight of 3000 or less, and a curing agent, the lubricating agent as well as the curing agent in the lower magnetic layer being diffused into the upper magnetic layer by the heat treatment.

11 Claims, 1 Drawing Sheet

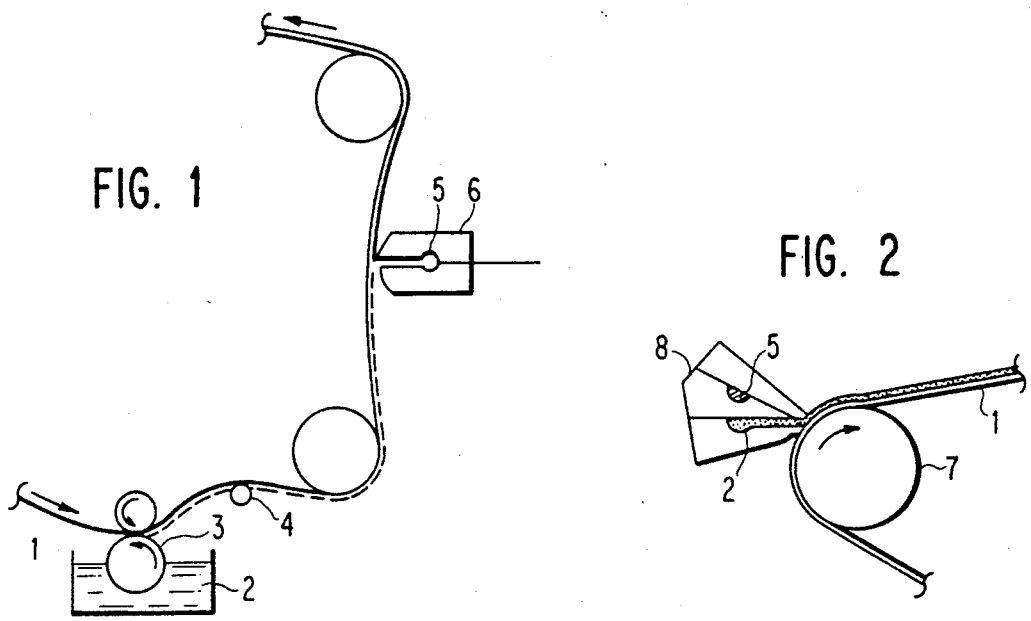
FIG. 1
FIG. 2
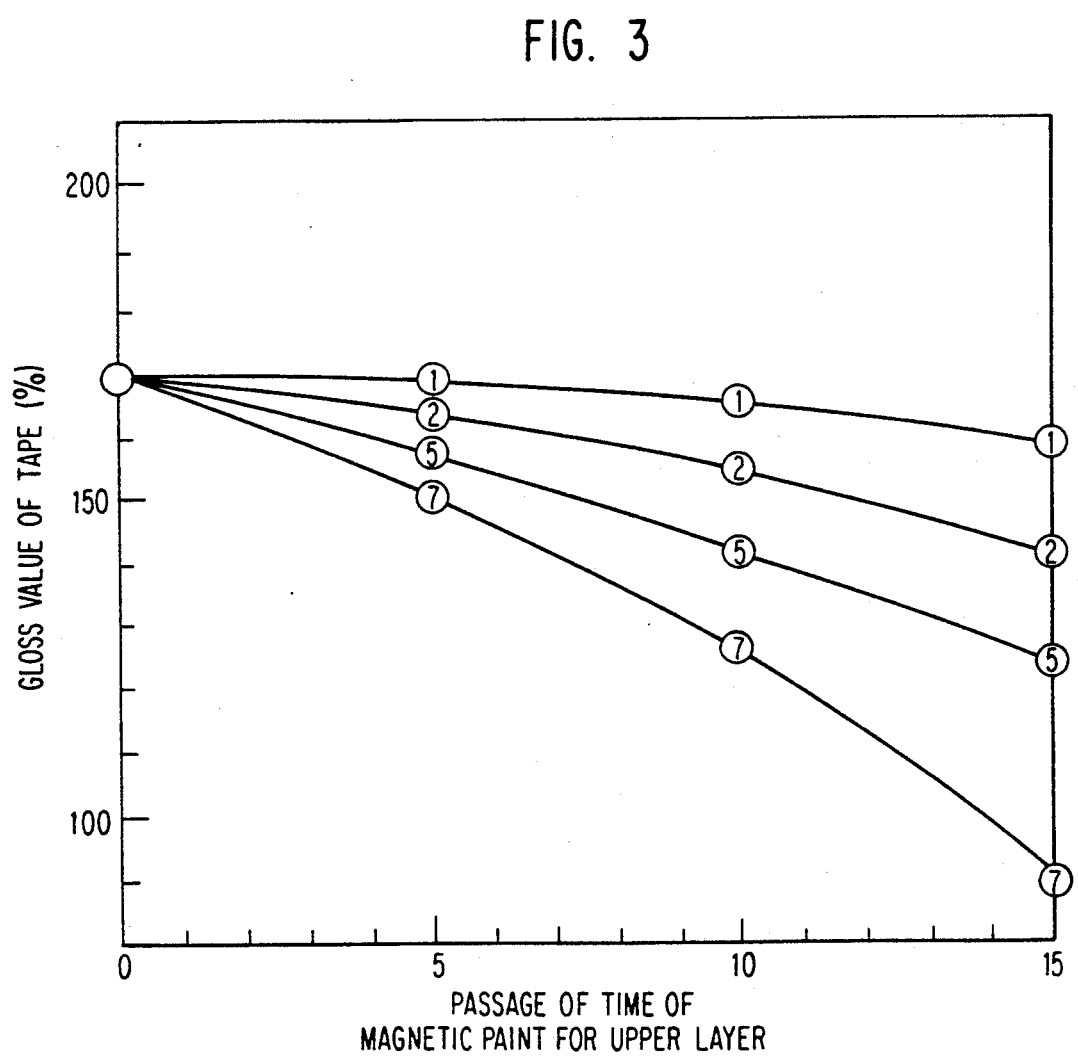
FIG. 3

METHOD FOR PRODUCING A MAGNETIC RECORDING MEDIUM

FIELD OF THE INVENTION

The present invention relates to a method for producing a magnetic recording medium such as a magnetic tape or a magnetic sheet. More particularly, it relates to a method for producing a magnetic recording medium which is excellent in electromagnetic characteristics and in running properties.

BACKGROUND OF THE INVENTION

Recently, there has been a growing demand for video tape of higher image quality. Also, there has been a growing demand for a floppy disk of higher densification as well as higher discrimination. To meet such demands, a magnetic layer comprising ferromagnetic particles is used. In order to increase the characteristics of an audio tape, it is known to use a tape comprising plural magnetic layers superposed upon each other. For example, JP-B-63-56608 (the term "JP-B" as used herein means an "examined Japanese patent publication") describes plural magnetic layers in which an upper magnetic layer comprises metal and a lower magnetic layer comprises iron oxides. Other examples of such tapes having plural magnetic layers are described in JP-B-63-56608, JP-A-63-94431, JP-A-60-256917, JP-A-60-124025, JP-A-54-159203, JP- A-53-16604, JP-A-51-474021, JP-A-58-56231, JP-A-58-53024, JP-A-58-17539, JP-A-57-143734, JP-A-56-34145, JP-A-54-145104, and JP-A-52-9401 (the term "JP-A" as used herein means an "unexamined and published Japanese patent application").

In order to maintain a good running property which is prerequisite for a magnetic recording medium having good electromagnetic characteristics, it is necessary that the coefficient of friction of the magnetic layer surface be small.

In order to increase the running property of a magnetic recording medium by decreasing the coefficient of friction of the magnetic layer surface, it is known to add lubricating agents to the magnetic layer. For example, in a magnetic recording medium which comprises an upper magnetic layer containing a large quantity of lubricating agents such as fatty acids and a lower magnetic layer being formed on a support and containing no lubricating agents, it has turned out that in the beginning, good running property continues due to the presence of the lubricating agents; however, with the elapse of time the lubricating agents move to the bottom portion of the lower magnetic layer, thereby significantly decreasing the running property of the magnetic recording medium.

Such a transfer of lubricating agents extensively occurs when the magnetic recording medium such as an audio tape or a video tape is allowed to stand or is used under conditions of high temperature. Even if a magnetic recording medium has good electromagnetic characteristics, when the running property thereof is lowered, such electromagnetic characteristics are not fully exhibited.

The present applicant proposed a magnetic recording medium in which the average content of lubricating agents in the upper magnetic layer is smaller than that in the lower magnetic layer. When a difference in the concentration of lubricating agents is provided in magnetic layers, lubricating agents in the lower magnetic layer, the content of which is large, move gradually to the upper magnetic layer in which the content of lubricating agents is small, with the result that the upper surface of the magnetic layers is always supplied with a desired amount of lubricating agents.

Lubricating agents present in the upper surface of the magnetic layers gradually adhere to a running system, so they are rubbed off. Therefore, the average content of lubricating agents in the upper magnetic layer is always smaller than the maximum content of lubricating agents in the lower magnetic layer, and consequently lubricating agents in the lower magnetic layer continue moving toward the upper magnetic layer over a long period of time. As a result, the lubricating property of the magnetic layer surface stays good, so that the magnetic recording medium exhibits an excellent running property. Since the amount of lubricating agents in the upper magnetic layer is not increased to excess, binders in the upper magnetic layer are rarely plasticized by lubricating agents. Therefore, when the magnetic recording medium is in contact with a running system, the surface of the magnetic layer is hardly damaged, so that the running durability as well as electromagnetic characteristics thereof are rarely lowered.

When ferromagnetic alloy particles are used for forming the upper magnetic layer, it is difficult to produce a magnetic recording medium in which sensitivity and S/N are high.

It can be assumed that this is because ferromagnetic alloy particles are liable to aggregate in a magnetic coating composition, and accordingly an aggregated mass is formed while the magnetic coating composition is dispersed, coated, and dried, thereby damaging the smoothness of the magnetic layer surface. It is not clear why the ferromagnetic alloy particles aggregate; however, it is thought that the molecules of the binders being adhered to the surface of magnetic particles are replaced with low molecular compounds having polar groups, thereby decreasing steric hindrance. It is thought that especially, fatty acids or polyfunctional low molecular compounds are apt to accelerate the aggregation of magnetic particles. On the other hand, when fatty acids of strong polarity, which seem to cause aggregation, are not used, the running property of the magnetic tape deteriorates.

Because of the above reasons, it is difficult to obtain a good quality magnetic recording medium such as a video tape, the surface of which is required to be smooth. Also, in a tape comprising plural magnetic layers, the upper magnetic layer usually has a thickness of 2 $\mu$m or less; therefore, it is particularly liable to be influenced by the above-mentioned aggregated mass. As a result, it is difficult to increase sensitivity and S/N.

SUMMARY OF THE INVENTION

An object of the present invention is to provide a method for producing a magnetic recording medium comprising an uppermost magnetic layer containing ferromagnetic alloy particles, in which the running property, durability, and especially electromagnetic characteristics are excellent.

The present inventors have studied aggregation of a magnetic coating composition containing ferromagnetic alloy particles. As a consequences, they have found that when an upper magnetic layer which does not contain lubricating agents such as fatty acid or relatively low molecular compounds having polar groups is formed on a lower magnetic layer which contains such lubricating agents, and thereafter a treatment by which such materials contained in the lower magnetic layer are caused to be diffused into the upper magnetic layer is carried out, the above-noted problems can be solved.

Namely, the present invention provides a method for producing a magnetic recording medium comprising coating on a nonmagnetic support a magnetic coating composition for forming a lower magnetic layer and coating thereon a magnetic coating composition for forming an upper magnetic layer using a wet-on-wet coating method, thereby forming plural magnetic layers, followed by drying, and then conducting heat treatment thereof, wherein said magnetic coating composition for forming said upper magnetic layer contains ferromagnetic alloy particles as ferromagnetic particles but does not contain a lubricating agent which has polar groups and has a molecular weight of 3000 or less, while said magnetic coating composition for forming said lower magnetic layer contains ferromagnetic iron oxide particles as ferromagnetic particles, a lubricating agent having polar groups and having a molecular weight of 3000 or less., and a curing agent, said lubricating agent as well as said curing agent in said lower magnetic layer being diffused

BRIEF DESCRIPTION OF THE DRAWING

FIGS. 1 and 2 are schematic views illustrating a coating method used in the present invention;

FIG. 3 is a graph plotting gloss value to evaluate pot life of a magnetic coating composition for forming an upper magnetic layer, wherein a number surrounded by a circle corresponds to that of a sample number shown in Table 1, and the measurements are carried out in such a way that a magnetic coating composition is coated by hand in a dry thickness of 5 $\mu$m, followed by conducting magnetic orientation, drying, and then being measured using a gloss meter ("GK45D" produced by Suga Tester Co., Ltd.).

DETAILED DESCRIPTION OF THE INVENTION

In the present invention, "a wet-on-wet coating method" is adopted. This method includes "a subsequent coating method" where a magnetic coating composition for forming a first magnetic layer is coated on a support and then a magnetic coating composition for forming the next magnetic layer is coated thereon while the magnetic coating composition for the first magnetic layer is wet, and "a simultaneous coating method" which is a simultaneous multicoating method where both magnetic coating compositions are simultaneously coated by an extruding coating method.

The above "wet-on-wet coating methods" are described in JP-A-62-212933 and JP-A-63-88080.

There will now be described one embodiment of the present invention with reference to the drawings.

FIGS. 1 and 2 show coating methods which can be used in the present invention. In FIG. 1, a coating liquid 2 for forming a lower magnetic layer, which contains a lubricating agent having polar groups and having a molecular weight of 3000 or less and a curing agent, is precoated using a coater 3 on a flexible support 1 of polyethylene terephthalate which is continuously running. Immediately after the precoating, the coated surface of the magnetic layer is smoothed using a smoothing roll 4, and a coating liquid 5 for forming an upper magnetic layer, which does not contain a lubricating agent having polar groups and having a molecular weight of 3000 or less, is coated thereon using another coater 6 while the coating liquid 2 is wet. In FIG. 2, the coating liquid 2 for forming the lower magnetic layer and the coating liquid 5 for forming the upper magnetic layer are simultaneously coated on the flexible support 1 using a backup roll 7 and a multicoating coater 8.

The magnetic layers formed on the nonmagnetic support are usually subjected to a treatment to orient ferromagnetic particles in the magnetic layers, i.e., a magnetic orientation treatment, and thereafter, are subjected to a drying treatment which includes a normal drying and if necessary, a calendering treatment, followed by a heat treatment. It follows that the resin ingredients are cured to form a cured product, and the lubricating agents and curing agents, etc. contained in the lower magnetic layer are diffused into the upper magnetic layer, thereby causing the curing agents to react with resins in the upper magnetic layer to cure them, thus obtaining a magnetic recording medium in which the aggregation of ferromagnetic alloy particles is excluded. The magnetic recording medium thus obtained is cut to a desired shape. If necessary, before the cutting, a surface smoothing treatment may be conducted. The magnetic recording medium thus treated may be subjected to a blade treatment, if necessary.

The Comparative Example 3 of JP-A-63-94431 shows an upper magnetic layer containing no fatty acids therein. However, the upper magnetic layer comprises ferromagnetic iron oxide particles, and the lower magnetic layer contains a high concentration of lubricating agents; furthermore, both the upper and lower magnetic layers do not contain curing agents, and a heat treatment is not carried out.

On the other hand, in the present invention, lubricating agents contained in the lower magnetic layer are diffused into the upper magnetic layer using mainly a drying treatment and a heat treatment, thereby obtaining substantially the same lubricating effects as those which can be obtained in a case where the lubricating agents are added to the upper magnetic layer. Also electromagnetic characteristics which cannot be obtained when the lubricating agents are added to the upper magnetic layer can be obtained. Namely, the present invention discloses a technique which can effectively reduce the above-noted undesirable aggregation of ferromagnetic particles.

In the present invention, it is necessary that the lower magnetic layer comprises ferromagnetic iron oxide particles which are not liable to aggregate even if lubricating agents having a relatively low molecular weight and having polar groups are added thereto. Further, it is necessary that ferromagnetic alloy particles be used for forming the upper magnetic layer. However, ferromagnetic iron oxide particles, $CrO_2$, barium ferrite, etc., can also be added as ferromagnetic particles in the upper magnetic layer.

In the present invention, when a heat treatment is not adopted, lubricating agents having a relatively low molecular weight and having polar groups, and curing agents insufficiently move from the lower magnetic layer to the upper magnetic layer, with the result that the content of such agents becomes low in the upper magnetic layer, thereby significantly deteriorating the lubricating properties as well as abrasion resistance of the magnetic recording medium.

The ferromagnetic alloy particles used in the present invention are alloy powders containing 60 wt% or more, preferably 70 wt% or more, most preferably 80 wt% or more, of iron as a main component, and, for example, can be manufactured by the following methods.

(1) A method in which there are reduced needle-like hydroxides, needle-like hydroxides containing other metals, or needle-like iron oxides obtained by such hydroxides.

(2) A method in which ferromagnetic metals are evaporated in an inert gas.

(3) A method in which a metal salt being capable of producing ferromagnetic materials is reduced in an aqueous solution thereof using a reducing agent such as boron hydride compounds, hypophosphites, or hydrazine, thereby obtaining ferromagnetic particles.

(4) A method in which organic acid salts of ferromagnetic metals are pyrolyzed and reduced using a reducing gas.

(5) A method in which a metal carbonyl compound is pyrolyzed.

(6) A method in which ferromagnetic metal particles are electrolytically deposited on a mercury cathode, and then separated from the mercury.

In the present invention, ferromagnetic alloy particles produced by the methods (1), (2), and (3) are easy to use, and particularly those produced by the method (1) are most preferred in terms of cost and quality. When ferromagnetic alloy particles are produced, it is preferred that the their surfaces be coated with an oxide film in order to improve their chemical stability.

The ferromagnetic alloy particles can be composed of an alloy containing Fe, Fe-Ni, or Fe-Ni-Co. In order to improve the characteristics thereof, there can be further added thereto a small amount of nonmagnetic or non-metallic element(s) such as B, C, N, Al, Si, P, S, Ti, Cr, Mn, Cu, or Zn.

The coercive force of the ferromagnetic alloy particles is preferably 900 to 5000 Oe, more preferably 1000 to 2500 Oe, most preferably 1100 to 2000 Oe.

A coercive force less than 900 Oe is undesirable, because the output and S/N are decreased. A coercive force more than about 5000 Oe is also undesirable, because signals are hard to record.

The average length in the long axis of the ferromagnetic alloy particles is preferably 0.20 μm or less, more preferably 0.15 μm or less. The acicular ratio thereof is preferably 3/1 to 20/1, more preferably 5/1 to 15/1.

Particle size more than 0.25 μm is not preferred since S/N is decreased. The lower limit of the particle size is about 100 to 200 Å.

Acicular needle ratio less than 3/1 is not preferred since the rectangular ratio is lowered, and sufficient sensitivity is difficult to obtain.

It is difficult to obtain ferromagnetic alloy particles having an acicular ratio of more than 20/1 and further such an acicular ratio is decreased during a dispersion step.

Ferromagnetic iron oxide particles for forming the lower magnetic layer of the present invention include $\gamma$-Fe$_2$O$_3$, Fe$_3$O$_4$, or FeOx (1.33 < X ≦ 1.5). The cobalt-containing ferromagnetic iron oxide particles used in the present invention include Co-FeOx (1.33 < X ≦ 1.5). The particle size and acicular ratio of the ferromagnetic iron oxide particles are the same as that of the alloy particles of the upper magnetic layer.

It is preferred that the ferromagnetic iron oxide particles have a lower coercive force than those in the upper magnetic layer and have a coercive force of 710 to 1500 Oe. When the coercive force is less than 710 Oe output of color signals from the video tape is too high. Ferromagnetic iron oxide particles having coercive force more than 1500 Oe are hard to manufacture, and also the output of color signals is lowered and further the recorded signals cannot be easily erased.

In the present invention, a lubricating agent having a molecular weight of 3000 or less and having polar groups includes compounds having polar groups such as —COOX, —SO$_3$X, —OSO$_3$X, —PO$_3$X$_3$,

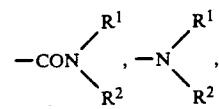

—OH, and

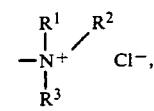

wherein X represents a hydrogen atom or a metal and R$^1$, R$^2$ and R$^3$ which may be the same or different, each represents a hydrogen atom or an alkyl group having 1 to 18 carbon atoms. Examples of such compounds include fatty acids having 12 to 22 carbon atoms, metallic soaps of fatty acids, alkylsulfonic acids or salts thereof, alkylbenzenesulfonic acids or salts thereof, alkylphosphoric acid esters, amides having a hydrocarbon group (e.g., an alkyl group) with 12 to 22 carbon atoms, amines having a hydrocarbon group (e.g., an alkyl group) with 12 to 22 carbon atoms, and alcohols having a hydrocarbon group (e.g., an alkyl group) with 12 to 22 carbon atoms. Among these, fatty acids, phosphoric acid esters, metallic soaps, or modified products of fatty acids are particularly preferred.

Molecular weight of the lubricating agents of more than 3000 is undesirable since the lubricating agents are hard to diffuse from the lower magnetic layer to the upper magnetic layer. The molecular weight is preferably 100 to 2000, more preferably 200 to 1000.

Such lubricating agents having polar groups are used in the lower magnetic layer in an amount of 0.1 to 30 parts by weight, preferably 0.2 to 20 parts by weight, more preferably 0.5 to 10 parts by weight, per 100 parts by weight of ferromagnetic particles in the upper and lower magnetic layers.

In addition to the above lubricating agents having polar groups, other lubricating agents which have no polar groups or poor polarity can be used in the lower magnetic layer. Examples of such other lubricating agents include squalane, hydrocarbon lubricating agents such as liquid paraffin, butyl stearate, fatty acid esters such as animal oils and vegetable oils, silicone oils such as dimethyl polysiloxane, and fluorine compounds such as fluorinated oils, and if necessary, these can be added to the upper magnetic layer.

Other additives such as abrasive agents having a Mohs' hardness of 5 or higher, preferably 6 or higher, carbon, or insoluble resin powders can be used. Examples of such abrasive agents include $\alpha$-Fe$_2$O$_3$, $\alpha$-Al$_2$O$_3$, $\gamma$-Al$_2$O$_3$, SiC, Cr$_2$O$_3$, and diamond, and these can be used alone or in combination. The carbon abrasives are commercially available and may be used alone or in combination.

Such additives can be used in an amount of 0.1 to 50 parts by weight, preferably 0.2 to 30 parts by weight, more preferably 0.5 to 20 parts by weight, based on the total amount of the ferromagnetic particles used in the magnetic recording medium.

A curing agent used in the present invention is a compound capable of curing resins used in the upper magnetic layer, and it is preferably a polyisocyanate such as diisocyanates, triisocyanates, or tetraisocyanates, selected from aliphatic compounds, aromatic compounds, and alicyclic compounds, each having two or more of —N=C=O group. Examples of such polyisocyanates include ethanediisocyanate; butanediisocyanate; hexanediisocyanate; 2,2'-dimethylpentanediisocyanate; 2,2,4-trimethylpentanediisocyanate; decanediisocyanate; ω,ω'-diisocyanate-1,3-dimethylbenzene; ω,ω'-diisocyanate-1,2-dimethycyclohexane; ω,ω'-diisocyanate-1,4-diethylbenzene; ω,ω'-diisocyanate-1,5-dimethylnaphthalene; ω,ω'-diisocyanate-n-propylbiphenyl 1 3-phenylenediisocyanate; 1-methylbenzene-2,4-diisocyanate; 1,3-dimethyl-benzene-2,6-diisocyanate; naphthalene-1,4- diisocyanate; 1,1'-dinaphthyl-2,2'-diisocyanate;biphenyl-2,4'-diisocyanate; 3,3'-dimethylbiphenyl-4,4'-diisocyanate; diphenylmethane-4,440 -diisocyanate; 2,2'-dimethyldiphenylmethane-4,4'-diisocyanate; 3,3'-dimethoxydiphenylmethane-4,4'-diisocyanate; 3,3'-diethoxydiphenylmethane-4,4'-diisocyanate; 1-methylbenzene-2,4,6-triisocyanate; 1,3,5-trimethylbenzene-2,4,6-triisocyanate; diphenylmethane-2,4,4'-triisocyanate; triphenylmethane-4,4',4''-triisocyanate; tolylene diisocyanate; 1,5-naphthylenediisocyanate; dimer to hexamer of such isocyanates; and addition products of such isocyanates and divalent alcohols or trivalent alcohols. Such addition products are, for example, an addition product of trimethylolpropane and tolylene diisocyanate, or an addition product of trimethylolpropane and hexamethylenediisocyanate.

These curing agents are used in the lower magnetic layer in an amount of from 5 to 70 parts by weight, preferably from 10 to 60 parts by weight, per 100 parts by weight of the binder in the lower and upper magnetic layers.

The above-described polyisocyanates are commercially available under the trade names of "Coronate L", "Coronate HL", "Coronate 2030", "Coronate 2031", "Millionate MR", "Millionate MTL" produced by Nippon Polyurethane Co., Ltd., "Takenate D-102", "Takenate D-110N", "Takenate D-200", "Takenate D-202" produced by Takeda Chemical Industries, Ltd; and "Desmodule L", "Desmcdule IL", "Desmodule N", "Desmodule HL" produced by Sumitomo Bayer Co., Ltd. These curing agents can be used alone or as mixtures thereof by taking advantages of the differences in their reactivities.

Examples of the binders used in the present invention include conventional binders such as vinyl chloride copolymers, polyurethane resins, polyester resins, epoxy resins, alkyd resins, acrylic resins, or cellulosic resins. These binders can be used alone or in combination.

The binder is used in an amount of from 10 to 200 parts by weight, preferably from 14 to 100 parts by weight, most preferably from 16 to 50 parts by weight, per 100 parts by weight of the ferromagnetic particles in the magnetic recording medium.

The ratio of binder to ferromagnetic particles are not so different between the lower magnetic layer and the upper magnetic layer, and the difference in the ratio is preferably, within 50 %, more preferably within 20% based on the ratio in the lower layer.

It is preferred that the binders contained in the upper and lower magnetic layers have good compatibility. When the binder compatibility is poor, the adhesion properties between the upper and lower magnetic layers are lowered, and the interface becomes coarse so that the interface property deteriorates.

The coating thickness of the upper magnetic layer is preferably 2.5 $\mu$m or less, more preferably from 0.01 to 2.0 $\mu$m, and most preferably from 0.05 to 1.0 $\mu$m. When it is more than 2.5 $\mu$m, it is undesirable since output at the short wave length region decreases due to thickness loss. Also, in such a case, it is undesirable since lubricating agents and curing agents in the lower magnetic layer are difficult to be evenly diffused into the upper magnetic layer. When it is less than 0.01 $\mu$m, it is undesirable since the effects due to the plural magnetic layers are lowered, and the output is reduced.

The thickness of the lower magnetic layer is generally from 0.5 to 10.0 $\mu$m, preferably from 1.0 to 5 $\mu$m, and more preferably from 2.0 to 5 $\mu$m. When it is less than 0.5 $\mu$m, it is undesirable since coating for forming plural magnetic layers is difficult to be concurrently conducted, and lubricating agents and curing agents in the lower magnetic layer are difficult to be diffused into the upper magnetic layer. When it is more than 10 $\mu$m, it is undesirable since adhesion properties between the lower magnetic layer and the support are deteriorated, and electromagnetic characteristics do not increase.

The heat treatment in the present invention is carried out at 40° to 110° C. for 30 minutes to 120 hours, preferably at 50° to 100° C. for 1 to 72 hours, more preferably at 60 to 90° C for 2 to 48 hours.

The plural magnetic layers according to the present invention may comprise two magnetic layers consisting of an upper magnetic layer and a lower magnetic layer, or three magnetic layers consisting of an upper magnetic layer, an intermediate magnetic layer, and a lower magnetic layer, or four or more magnetic layers. When there are three or more magnetic layers, an upper magnetic layer means an uppermost magnetic layer, and a lower magnetic layer means a magnetic layer or magnetic layers other than the upper magnetic layer. In addition, an undercoat layer other than magnetic layers may be formed between the lower magnetic layer and the support.

Examples of materials for forming a nonmagnetic support include polyester resins, polyolefin resins, cellulose derivatives, polycarbonate resins, polyimide resins, and polyamide-imide resins. Also, there can be used aluminum, copper, tin, zinc, nonmagnetic metals including such metals, plastics metallized with metals such as aluminum, paper, or papers coated or laminated with polyolefins. The shape of the nonmagnetic support is not particularly limited, however, a sheet-like one can be usually used. The nonmagnetic support may be formed into a shape of film, tape, disk, card, or drum.

When a sheet-like nonmagnetic support is used, it usually has a thickness of from 5 to 50 $\mu$m.

The nonmagnetic support may be provided with a backing layer on a surface of a support on which magnetic layers are not formed.

Ferromagnetic particles, binders, lubricating agents, curing agents, and if necessary abrasives, or fillers are mixed with solvents to prepare the magnetic coating composition for the upper and lower magnetic layers of the present invention. Such solvents can be those usually used for forming a magnetic coating composition.

The mixing methods are not particularly limited, and the order of addition for each ingredient can be optionally set.

When the magnetic coating compositions are prepared, conventional additives such as dispersing agents, antistatic agents, etc. can be used in combination.

The magnetic coating compositions thus prepared are coated on the above-noted nonmagnetic support.

According to the present invention, the magnetic coating composition for forming the upper magnetic layer does not contain lubricating agents having relatively low molecular weight; therefore, the aggregation of ferromagnetic alloy particles which are liable to aggregate can be prevented. Further, heat treatment follows a wet-on-wet coating method, so that lubricating agents contained in the lower magnetic layer are diffused into the upper magnetic layer, thereby producing lubricating effects. In addition, the magnetic coating composition for forming the lower magnetic layer contains ferromagnetic iron oxide particles, therefore, even if lubricating agents having polar groups are contained therein, problems such as aggregation do not occur.

The present invention will be illustrated in more detail by the following Examples and Comparative Examples. In all Examples, and Comparative Examples, all parts are by weight, and "wet-on-wet coating methods" are adopted.

EXAMPLE 1

| Formulation of a magnetic coating composition for an lower magnetic layer | |
|---|---|
| Ferromagnetic particles (Co-γ-FeOx: x = 1.45, average length in the long axis: 0.2 μm, crystallite size: 270 Å, and Hc: 800 Oe) | 100 parts |
| Carboxyl group-containing vinyl chloride based copolymer ("MPR-TM" produced by Nisshin Chemical Co., Ltd.) | 10 parts |
| Polyester polyurethane ("Krysbon 7209" produced by Dainippon Ink Co., Ltd.) | 10 parts |
| Conductive carbon (Particle size: 15 mμ) | 2 parts |
| α-Fe$_2$O$_3$ (Particle size: 0.4 mμ) | 5 parts |
| Solvent (Methyl ethyl ketone/ cyclohexanone = 5/5) | 250 parts |

| Formulation of a magnetic coating composition for an upper magnetic layer | |
|---|---|
| Ferromagnetic particles (Fe alloy particles containing 4% of Al and trace amounts of Zn, etc., average length in the long axis: 0.1 μm, crystallite size: 180 Å, Hc: 1500 Oe) | 100 parts |
| Epoxy group-containing vinyl chloride based copolymer ("MR-110" produced by Nippon Zeon Co., Ltd.) | 10 parts |
| Polyester polyurethane ("UR-8300" produced by Toyoboh Co., Ltd) | 10 parts |
| Conductive carbon (particle size: 90 mμ) | 1 part |
| α-Al$_2$O$_3$ (particle size: 0.2 μm) | 5 parts |
| Solvent (Methyl ethyl ketone/ cyclohexanone = 6/4) | 300 parts | components of the magnetic coating composition were dispersed using a conventional method and filtered off to obtain the magnetic coating compositions.

Using the magnetic coating compositions thus formed, as shown in Table 1, a curing agent and a lubricating agent were added thereto and mixed therewith. Then, using an extrusion type coating head in which two slits were formed in one head, the coating composition for the upper magnetic layer and the coating composition for the lower magnetic layer were concurrently coated on a 10 μm-thick polyethylene terephthalate support in thicknesses of 0.5 μm and 2.5 μm, respectively. The thus coated support was subjected to magnetic orientation, drying, and calendering, and then heat treatment was conducted for 24 hours at 80° C. The heat treated support was slit to 8 mm width to prepare a video tape.

In the samples prepared herein, the following curing agents and lubricating agents were used in amounts (parts) as shown in Table 1. The amounts of these additives were set taking the thicknesses of the upper and lower magnetic layers into account since the contents of the additives are averaged between the upper and lower layers upon the heat treatment.

H : Curing agent (polyisocyanate; "COronate L-75" produced by Nippon polyurethane Co., Ltd.)

PR : Stearic acid (Industrial grade, purity 95%)

NR : Butyl stearate (Industrial grade, purity 95%)

The upper magnetic layer having a thickness of 0.5 μm in Sample Nos. 1 to 8 could not be formed by a coating method other than the simultaneous coating method.

TABLE 1

| Sample No. | Upper Layer H | Upper Layer PR | Upper Layer NR | Lower Layer H | Lower Layer PR | Lower Layer NR | Anti-alcohol property | YS (dB) | Y S/N (dB) | CS (dB) | C S/N (dB) | 0° C. still durability (min) |
|---|---|---|---|---|---|---|---|---|---|---|---|---|
| 1 | — | — | — | 16.0 | 2.4 | 1.2 | A | 1.6 | 1.4 | 1.8 | 1.3 | 100 |
| 2 | 13.3 | — | — | 13.3 | 2.4 | 1.0 | A | 1.4 | 1.2 | 1.6 | 1.3 | 110 |
| 3 | 13.3 | — | 1.0 | 13.3 | 2.4 | 1.0 | A | 1.5 | 1.3 | 1.5 | 1.2 | 120 |
| 4 | — | — | 1.0 | 16.0 | 2.4 | 1.0 | A | 1.5 | 1.4 | 1.7 | 1.3 | 120 |
| 5 | — | 2.0 | — | 16.0 | 2.0 | 1.2 | A | 0.8 | 0.6 | 1.2 | 0.9 | 80 |
| 6 | 13.3 | 2.0 | — | 13.3 | 2.0 | 1.2 | A | 0.0 | 0.1 | 1.0 | 0.3 | 100 |
| 7 | 13.3 | 2.0 | 1.0 | 13.3 | 2.0 | 1.0 | A | 0.0 | 0.0 | 1.2 | 0.6 | 70 |
| 8 | — | 2.0 | 1.0 | 16.0 | 2.0 | 1.0 | A | 0.3 | 0.2 | 0.8 | 0.7 | 80 |
| 9 | 16.0 | 2.4 | 1.2 | | | | A | 0.0 | 0.0 | 0.0 | 0.0 | 70 |
| 10 | — | — | — | | | | B | — | — | — | — | — |

Note:
Sample Nos. 5-10: Comparison
Sample No. 1-8: dual layer structure (upper layer: 0.5 μm, lower layer: 2.5 μm)
Sample No. 9-10: (Single layer structure (3.0 μm)

The evaluation methods adopted in the above Table 1 were as follows.

YS :

The value shows an output at 4.8 MHz using a tape deck "EVS 800" produced by Sony Corporation, taking the output of Nos. 9 as 0 dB.

YS/N :

The value shows a S/N of Y signal which is corrected by visual appreciation.

CS :

The value shows an output at 750 KHz.

Still at 0° C. :

The value shows a still durability at 0° C. which is the time of the S/N of the images to decrease 6 dB.

Resistance to alcohols :

The surface of the magnetic layer was rubbed with cotton cloth impregnated with alcohol 50 times to check whether the magnetic layer is dissolved (as designated "B") or not (as designated "A").

As seen from Table 1, Samples No.1 to No.4 are samples of the present invention, and the remainder are comparative samples. Among comparative samples, Sample Nos.9 and 10 contain a single magnetic layer, and especially Sample No.9 is a conventional one.

Sample No.10 did not contain curing agents and lubricating agents in its magnetic layer, with the result that it could not run on the deck and no measurement was made.

As seen from the comparison between Sample No.1 and Sample No.10, when the simultaneous coating method according to the present invention is conducted, curing agents and lubricating agents move from Sample Nos. 5 and 7 according to the comparative samples in which the magnetic coating compositions for the upper magnetic layers contain low molecular weight compounds having polar groups such as stearic acid.

EXAMPLE 2

The same procedures as in Samples Nos. 3, 4, 7, and 8 were repeated to prepare Sample Nos. 11 to 14 except that myristic acid was used instead of stearic acid. Further, the same procedures as in Sample Nos. 3, 4, 7, and 8 were repeated to prepare Sample Nos. 15 to 18 except that behenic acid was used instead of stearic acid. Also the same procedure as in Sample No. 1 of the present invention was repeated except that heat treatment was not adopted, thereby to prepare Sample No. 19 of a comparative sample.

Properties of the thus prepared samples were measured in the same manner as in Example 1, and the results are shown in Table 2. In Table 2, numbers given in parentheses correspond to sample number in Table 1.

TABLE 2

| Sample No.*1 | Upper Layer | | | Lower Layer | | | Anti-alcohol property | YS (dB) | Y S/N (dB) | CS (dB) | C S/N (dB) | 0° C. still durability (min) |
| --- | --- | --- | --- | --- | --- | --- | --- | --- | --- | --- | --- | --- |
| | H | Fatty acid | NR | H | Fatty acid | NR | | | | | | |
| 11(3) | 13.3 | — | 1.0 | 13.3 | 2.4 | 1.0 | A | 1.6 | 1.5 | 1.5 | 1.3 | 110 |
| 12(4) | — | — | 1.0 | 16.0 | 2.4 | 1.0 | A | 1.5 | 1.5 | 1.8 | 1.5 | 110 |
| 13(7) | 13.3 | 2.0 | 1.0 | 13.3 | 2.0 | 1.0 | A | 0.2 | 0.1 | 1.4 | 0.8 | 60 |
| 14(8) | — | 2.0 | 1.0 | 16.0 | 2.0 | 1.0 | A | 0.5 | 0.4 | 1.0 | 0.9 | 60 |
| 15(3) | 13.3 | — | 1.0 | 13.3 | 2.4 | 1.0 | A | 1.3 | 1.2 | 1.3 | 1.0 | 130 |
| 16(4) | — | — | 1.0 | 16.0 | 2.4 | 1.0 | A | 1.3 | 1.3 | 1.5 | 1.2 | 120 |
| 17(7) | 13.3 | 2.0 | 1.0 | 13.3 | 2.0 | 1.0 | A | −0.2 | −0.3 | 0.9 | 0.4 | 80 |
| 18(8) | — | — | 1.0 | 16.0 | 2.0 | 1.0 | A | 0.1 | 0.0 | 0.7 | 0.5 | 70 |
| 19(1) | — | — | — | 16.0 | 2.4 | 1.2 | A−B*2 | 1.7 | 1.5 | 1.8 | 1.4 | 5 |

Note:
*1Sample Nos. 13–14 and 17–19: Comparison
*2slightly dissolved.

the lower magnetic layer to the upper magnetic layer; therefore, there was no problem as to resistance to alcohols and durability.

As seen from the comparison between Sample No.1 and Sample No.9, the tape comprising plural magnetic layers according to the present invention is superior to the conventional tape comprising single magnetic layer in electromagnetic characteristics and durability.

It is apparent that even if a magnetic recording medium comprises plural magnetic layers, when polyisocyanates and fatty acids coexist in the upper magnetic layer, the electromagnetic characteristics are hardly improved.

According to the present invention, the pot life of a magnetic coating composition containing ferromagnetic alloy particles which are easy to aggregate can be prolonged (see FIG. 3), and also there can be obtained a magnetic recording medium comprising plural magnetic layers in which electromagnetic characteristics and durability are excellent.

As shown in Sample No.4, even if low molecular weight compounds having low polarity such as butyl stearate are added to the magnetic coating composition for forming the upper magnetic layer, problems hardly occur.

In Sample No.3, curing agents and butyl stearate are used, however, good results are obtained as in the case of other samples of the invention.

As seen from FIG. 3, the pot life of the magnetic coating compositions which are used for forming the upper magnetic layers of Samples Nos. 1 and 2 according to the present invention are longer than that of Samples Nos. 11, 12, 15, and 16, which are according to the present invention, use myristic acid or behenic acid instead of stearic acid; and, they exhibit excellent electromagnetic characteristics and still life. On the contrary, Sample Nos. 13, 14, 17, and 18, which are according to comparative examples, use myristic acid or behenic acid instead of stearic acid; however, magnetic recording media thus obtained show poor electromagnetic characteristics and still life as compared to the present invention.

In Sample No. 19 (comparative sample), heat treatment is not conducted; therefore, curing agents and lubricating agents cannot fully move to the upper magnetic layer so that resistance to alcohols and still life are insufficient.

While the invention has been described in detail and with reference to specific embodiments thereof, it will be apparent to one skilled in the art that various changes and modifications can be made therein without departing from the spirit and scope thereof.

What is claimed is:

1. A method for producing a magnetic recording medium comprising coating on a nonmagnetic support a magnetic coating composition for forming a lower magnetic layer and coating thereon a magnetic coating composition for forming an upper magnetic layer using a wet-on-wet coating method, thereby forming plural magnetic layers, followed by drying, and then conducting heat treatment thereof, wherein said magnetic coating composition for said upper magnetic layer contains ferromagnetic alloy particles as ferromagnetic particles, and does not contain a lubricating agent which has polar groups and has a molecular weight of 3000 or less, said magnetic coating composition for said lower magnetic layer contains ferromagnetic iron oxide particles as ferromagnetic particles, a lubricating agent having polar groups and having a molecular weight of 3000 or less, and a curing agent, and said lubricating agent as well as said curing agent in said lower magnetic layer being diffused into said upper magnetic layer by said heat treatment.

2. The process of claim 1, wherein sequential wet-on-wet coating is carried out.

3. The method of claim 1, wherein simultaneous wet-on-wet coating is carried out.

4. The method of claim 1, wherein the lubricating agent in the lower magnetic layer contains polar groups selected from the group consisting of $-COOX$, $-SO_3X$, $-OSO_3X$, $-PO_3X_3$,

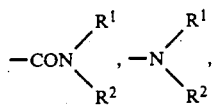

—OH, and

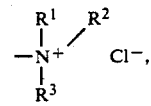

wherein X represents a hydrogen atom or a metal and $R^1$, $R^2$ and $R^3$ which may be the same or different, each represents a hydrogen atom or an alkyl group having 1 to 18 carbon atoms.

5. The method of claim 1, wherein the lubricating agent in the lower magnetic layer is selected from the group consisting of fatty acids, phosphoric acid esters and metallic soaps.

6. The method of claim 1, wherein the curing agent in the lower magnetic layer is a polyisocyanate.

7. The method of claim 1, wherein the thickness of the upper magnetic layer is 0.05 to 1 μm.

8. The method of claim 1, wherein the thickness of the lower magnetic layer is 2 to 5 μm.

9. The method of claim 1, wherein the coercive force of the upper magnetic layer is 1,000 to 2,500 Oe.

10. The method claim 1, wherein the coercive force of the lower magnetic layer is less than the coercive force of the upper magnetic layer and is 710 to 1,500 Oe.

11. The method of claim 1, wherein the heat treatment is carried out at 50° to 100° C. for 1 to 72 hours.

* * * * *